(12) United States Patent
Wang

(10) Patent No.: US 10,950,201 B2
(45) Date of Patent: Mar. 16, 2021

(54) BRIGHTNESS CONTROL METHOD AND TERMINAL DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Tiegang Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/560,349

(22) Filed: Sep. 4, 2019

(65) Prior Publication Data
US 2020/0273427 A1 Aug. 27, 2020

(30) Foreign Application Priority Data
Feb. 25, 2019 (CN) .......................... 201910138527.3

(51) Int. Cl.
*G09G 5/10* (2006.01)
*G06K 9/00* (2006.01)

(52) U.S. Cl.
CPC ........... *G09G 5/10* (2013.01); *G06K 9/00006* (2013.01); *G09G 2320/0247* (2013.01); *G09G 2320/0626* (2013.01)

(58) Field of Classification Search
None
See application file for complete search history.

(56) References Cited

U.S. PATENT DOCUMENTS

| 2018/0314874 A1* | 11/2018 | Yang ..................... G06F 3/0487 |
| 2019/0102063 A1 | 4/2019 | Qian et al. |
| 2019/0303640 A1* | 10/2019 | Song .................. G06K 9/00033 |
| 2020/0006448 A1* | 1/2020 | Chen .................. H01L 27/3216 |

(Continued)

FOREIGN PATENT DOCUMENTS

| CN | 101354487 A | 1/2009 |
| CN | 103247281 A | 8/2013 |

(Continued)

OTHER PUBLICATIONS

First Office Action for Chinese Application No. 201910138527.3, dated Apr. 24, 2020, 10 Pages.

(Continued)

*Primary Examiner* — Duane N Taylor, Jr.
(74) *Attorney, Agent, or Firm* — Brooks Kushman P.C.

(57) ABSTRACT

The present disclosure provides a brightness control method and a terminal device. The brightness control method includes: when confirming switching from a first mode to a second mode, adjusting a brightness of a first area of a screen of the terminal device from a first brightness to a second brightness; where the first brightness is the brightness of the first area in the first mode, and the first brightness is different from the second brightness; and, after entering the second mode, setting a brightness of a second area of the screen to be a third brightness. After entering the second mode, the brightness of the first area is the second brightness.

20 Claims, 2 Drawing Sheets

(56) References Cited

U.S. PATENT DOCUMENTS

| | | | |
|---|---|---|---|
| 2020/0019804 A1* | 1/2020 | Kim | G06K 9/00912 |
| 2020/0151417 A1* | 5/2020 | Yuan | G06K 9/00013 |
| 2020/0160814 A1 | 5/2020 | Han et al. | |

FOREIGN PATENT DOCUMENTS

| | | |
|---|---|---|
| CN | 107728879 A | 2/2018 |
| CN | 108766975 A | 11/2018 |
| CN | 109256090 A | 1/2019 |
| CN | 109343759 A | 2/2019 |
| KR | 101756344 B1 | 7/2017 |
| KR | 20180092055 A | 8/2018 |

OTHER PUBLICATIONS

Third Office Action for Chinese Application No. 201910138527.3, dated Feb. 3, 2021, 9 Pages.

* cited by examiner

BRIGHTNESS CONTROL METHOD AND TERMINAL DEVICE

CROSS-REFERENCE TO RELATED APPLICATION

This application claims priority to Chinese Patent Application No. 201910138527.3 filed on Feb. 25, 2019, which is incorporated herein by reference in its entirety.

TECHNICAL FIELD

The present disclosure relates to the field of displaying technologies, and in particular to a brightness control method and a terminal device.

BACKGROUND

When one terminal device is applied to some special scenes and these scenes require high brightness display in a certain specific area of the terminal device, one brightness adjustment method of the terminal device is usually to first adjust all areas of a screen to high brightness, and then lower the brightness of other areas while ensuring the high brightness of the specific area. However, there are flicker problems in the above process.

SUMMARY

One embodiment of the present disclosure provides a brightness control method applied to a terminal device, including: when confirming switching from a first mode to a second mode, adjusting a brightness of a first area of a screen of the terminal device from a first brightness to a second brightness; where the first brightness is the brightness of the first area in the first mode, and the first brightness is different from the second brightness; and, after entering the second mode, setting a brightness of a second area of the screen to be a third brightness; where after entering the second mode, the brightness of the first area is the second brightness.

Optionally, the first mode is a non-fingerprint identification mode, and the second mode is a fingerprint identification mode.

Optionally, the second area is a fingerprint identification area, and the first area is an area of the screen other than the second area.

Optionally, the terminal device is pre-configured with a first gamma data for the second mode. After entering the second mode, setting a brightness of a second area of the screen to be a third brightness, includes: after entering the second mode, setting a driving voltage of the second area to a first driving voltage and setting a driving voltage of the first area to a second driving voltage, and calling the first gamma data for displaying. When the driving voltage of the second area is set to the first driving voltage and the first gamma data is called, the brightness of the second area is the third brightness; and when the driving voltage of the first area is set to the second driving voltage and the first gamma data is called, the brightness of the first area is the second brightness.

Optionally, the terminal device is pre-configured with a second gamma data for the first mode, the method further includes: in the first mode, adjusting brightness of the first area and the second area by calling the second gamma data.

Optionally, when a pulse width modulation (PWM) value of the screen is less than or equal to a preset threshold, the second driving voltage is a driving voltage obtained in a way of compensating a difference driving voltage with a preset compensation intensity value, where the difference driving voltage is a driving voltage corresponding to a difference of the third brightness and the second brightness; or, when the pulse width modulation value of the screen is greater than the preset threshold, the second driving voltage is the driving voltage corresponding to the difference of the third brightness and the second brightness.

Optionally, when confirming switching from a first mode to a second mode, adjusting a brightness of a first area of a screen of the terminal device from a first brightness to a second brightness, includes: during a time period between confirming entering the second mode and entering the second mode, controlling the brightness of the first area of the screen of the terminal device to change gradually from the first brightness to the second brightness.

Optionally, the second area is at a first position in a preset area in a first time period, and the second area is at a second position in the preset area in a second time period; the first time period and the second time period are different time periods, and the first position and the second position are different positions.

Optionally, the method further includes: controlling, by the terminal device, the second area to be located at different positions in a preset area at different time periods.

Optionally, adjusting a brightness of a first area of a screen of the terminal device from a first brightness to a second brightness, includes: automatically controlling, by the terminal device, the brightness of the first area of the screen from the first brightness to the second brightness.

One embodiment of the present disclosure further provides a terminal device including: a brightness adjustment circuit configured to, when confirming switching from a first mode to a second mode, adjust a brightness of a first area of a screen of the terminal device from a first brightness to a second brightness; where the first brightness is the brightness of the first area in the first mode, and the first brightness is different from the second brightness. The brightness adjustment circuit is further configured to, after entering the second mode, set a brightness of a second area of the screen to be a third brightness; where after entering the second mode, the brightness of the first area is the second brightness.

Optionally, the terminal device is pre-configured with a first gamma data for the second mode; the brightness adjustment circuit is further configured to, after entering the second mode, set a driving voltage of the second area to a first driving voltage and set a driving voltage of the first area to a second driving voltage, and call the first gamma data for displaying. When the driving voltage of the second area is set to the first driving voltage and the first gamma data is called, the brightness of the second area is the third brightness; when the driving voltage of the first area is set to the second driving voltage and the first gamma data is called, the brightness of the first area is the second brightness.

Optionally, the terminal device is pre-configured with a second gamma data for the first mode; the brightness adjustment circuit is further configured to, in the first mode, adjust brightness of the first area and the second area by calling the second gamma data.

Optionally, the brightness adjustment circuit is further configured to control the second area to be located at different positions in a preset area at different time periods.

Optionally, the brightness adjustment circuit is further configured to control the brightness of the first area of the screen from the first brightness to the second brightness.

Optionally, the brightness adjustment circuit is a driving integrated circuit (IC) or a brightness control circuit in the screen.

One embodiment of the present disclosure further provides a terminal device with a screen fingerprint identification function, including: a memory, a processor, and a computer program stored on the memory and executable on the processor. The computer program is executed by the processor to implement steps of the above brightness control method.

One embodiment of the present disclosure further provides a computer readable storage medium, storing a computer program. The computer program is executed by a processor to implement steps of the above brightness control method.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions of embodiments of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
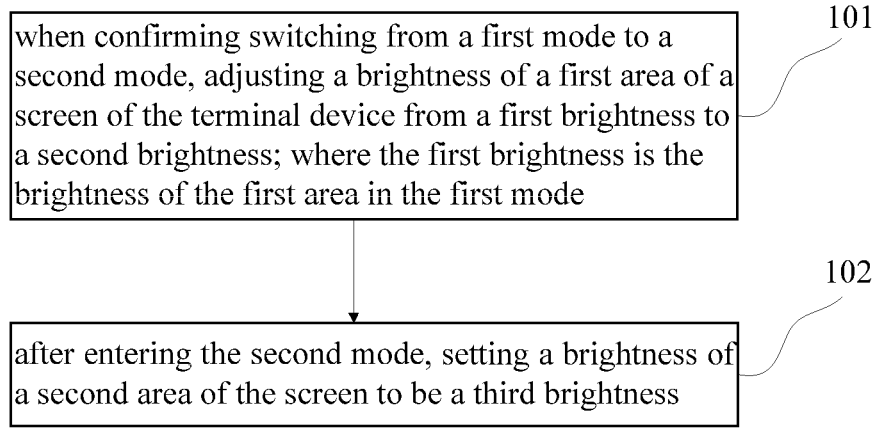
FIG. 1 is a flow chart of a brightness control method according to an embodiment of the present disclosure.

Referring to FIG. 1, FIG. 1 is a flow chart of a brightness control method according to an embodiment of the present disclosure. As shown in FIG. 1, the brightness control method may be applied to a terminal device and includes the following steps:

at step 101, when confirming switching from a first mode to a second mode, adjusting a brightness of a first area of a screen of the terminal device from a first brightness to a second brightness; where the first brightness is the brightness of the first area in the first mode, and the first brightness is different from the second brightness; and at step 102, after entering the second mode, setting a brightness of a second area of the screen to be a third brightness; where after entering the second mode, the brightness of the first area is the second brightness.

The above first mode may be a normal mode, and the second mode may be a functional mode. For example, the first mode is a non-fingerprint identification mode, and the second mode is a fingerprint identification mode. The above fingerprint identification mode may be a fingerprint identification unlock mode or other modes requiring fingerprint identification. In some embodiments, the first mode may be a terminal device unlock mode, and the second mode may be a terminal device lock mode.

Further, in case that the above first mode is the non-fingerprint identification mode and the above second mode is the fingerprint identification mode, the second area is a fingerprint identification area, and the first area is an area of the screen other than the second area. In other cases, the second area may be a functional area, and the first area is an area of the screen other than the functional area. For example, in a lock mode, the second area is a functional area for displaying information such as time and weather, and the first area is another area.

Further, the step 101 of adjusting a brightness of a first area of a screen of the terminal device from a first brightness to a second brightness, may be performed by multiple brightness adjustments. In other words, multiple brightness changes occur during the process of adjusting the brightness of the first area of the screen from the first brightness to the second brightness, and this change relationship of the multiple brightness changes with time corresponds to the change relationship of changing from the first brightness to the second brightness. For example, the second brightness is higher than the first brightness, then the change relationship of the multiple brightness changes with time is an incremental relationship, i.e., the step 101 can gradually change the brightness of the screen. In some embodiments, the terminal device automatically controls the brightness of the first area of the screen from the first brightness to the second brightness.

It should be noted that since the step 101 is performed prior to the step 102, the flicker problem caused by the sudden change of the first area from the first brightness to the second brightness after entering the second mode can be avoided, thereby improving display performance of the terminal device.

In addition, the step 101 may be performed after confirming that the above terminal device is required to enter the second mode but prior to entering the second mode. The step 101 may also be performed when entering the second mode.

The above entering the second mode may be to switch from the first mode to the second mode, then, the brightness of the first area in the first mode may be understood as the brightness of the terminal device before entering the second mode.

The above third brightness may be the brightness of the second area in the second mode, and then the above second brightness may be the brightness of the first area in the second mode. For example, the above third brightness may be a brightness of the fingerprint identification area in the fingerprint identification mode, and the above second brightness may be the brightness of the first area in the fingerprint identification mode.

Optionally, the above third brightness may be higher than the above second brightness. This help to identify fingerprint information more accurately in the fingerprint identification area in the fingerprint identification mode. The brightness of the first area is low, which can save power consumption of the terminal device.

Through the above steps, the brightness of the second area can be accurately controlled, thereby improving the display performance of the terminal device. This can further avoid the flicker problem of the first area after entering the second mode, thereby improving display performance of the terminal device.

It should be noted that the above terminal device may be a terminal device with screen brightness capable of being controlled by areas, such as a mobile phone, a tablet computer or other terminal devices with screen fingerprint identification functions.

As an optional embodiment, the step 101 of adjusting a brightness of a first area of a screen of the terminal device from a first brightness to a second brightness when confirming switching from a first mode to a second mode, includes: during a time period between confirming entering the second mode and entering the second mode, controlling the brightness of the first area of the screen of the terminal device to change gradually from the first brightness to the second brightness.

In this embodiment, a dimming function of from the first mode to the second mode may be added. When the terminal device enters the second mode for the first mode, the brightness of the above first area is increased in a dimming mode to control the brightness of the first area of the screen of the terminal device to change gradually from the first brightness to the second brightness.

In addition, a time point for confirming entering the second mode may be preset, or may be a time point at which a certain operation input by the user is received, for example, a time point at which lighting lock screen input by the user is received.

For example, a time period of 8 frames (i.e., 132 ms) may be added before entering the second mode. Then, the above time point for confirming entering the second mode may be 132 ms before entering the second mode.

The above gradually changing the brightness from the first brightness to the second brightness may be performed by controlling the brightness of the first area to be sequentially changed for several times. This change relationship of the multiple brightness changes with time corresponds to the change relationship of changing from the first brightness to the second brightness. For example, the second brightness is higher than the first brightness, then the change relationship of the multiple brightness changes with time is an incremental relationship, thereby gradually changing the brightness of the screen.

In this embodiment, since the brightness of the first area is controlled to be gradually changed from the first brightness to the second brightness, this can avoid sudden changes in the brightness from one value to another value. In this way, the human eyes can't see the flicker phenomenon, thereby avoiding screen flicker caused by the sudden change of the brightness of the first area to the second brightness and then improving the display performance.

As an optional embodiment, the terminal device is pre-configured with a first gamma data for the second mode. After entering the second mode, setting a brightness of a second area of the screen to be a third brightness, includes: after entering the second mode, setting a driving voltage of the second area to a first driving voltage and setting a driving voltage of the first area to a second driving voltage, and calling the first gamma data for displaying. When the driving voltage of the second area is set to the first driving voltage and the first gamma data is called, the brightness of the second area is the third brightness. When the driving voltage of the first area is set to the second driving voltage and the first gamma data is called, the brightness of the first area is the second brightness.

The above first gamma data is a newly added first gamma data for the second mode in some embodiments of the present disclosure, for example, a gamma data for the screen fingerprint identification function. Specifically, a group of gamma data may be pre-configured, and the above first gamma data is one gamma data of the group of gamma data. The group of gamma data may correspond to 256 gray scales. In addition, the group of gamma data may be individually controlled, so that the brightness of the second area may be adjusted independently.

The brightness corresponding to the above first gamma data is the above third brightness, and the driving voltage corresponding to the above first gamma data is above first driving voltage. In this way, when the driving voltage of the second area is set to the above first driving voltage and the first gamma data is called, the brightness of the second area is the third brightness. Furthermore, the above second driving voltage may be preconfigured. When the driving voltage of the above first area is preset to be the above second driving voltage and the above first gamma data is called, the brightness of the above first area is the above second brightness. For example, the above second driving voltage is a driving voltage corresponding to a difference of the above third brightness and the second brightness. Specifically, the above second driving voltage may be obtained in advance by debugging according to the difference between the third brightness and the second brightness or by linear interpolation based on the difference between the third brightness and the second brightness, so that when the driving voltage of the first area is set to the above second driving voltage and the first gamma data is called, the brightness of the first area is the second brightness. Of course, the above second driving voltage may be obtained in other ways, which are not specifically limited herein.

In this embodiment, since the gamma data for the above second mode is called, this makes the brightness of the second area more accurate in the second mode. Further, the brightness of the identification area is more accurate in the fingerprint identification mode, thereby improving the accuracy of fingerprint identification.

Figure 2:
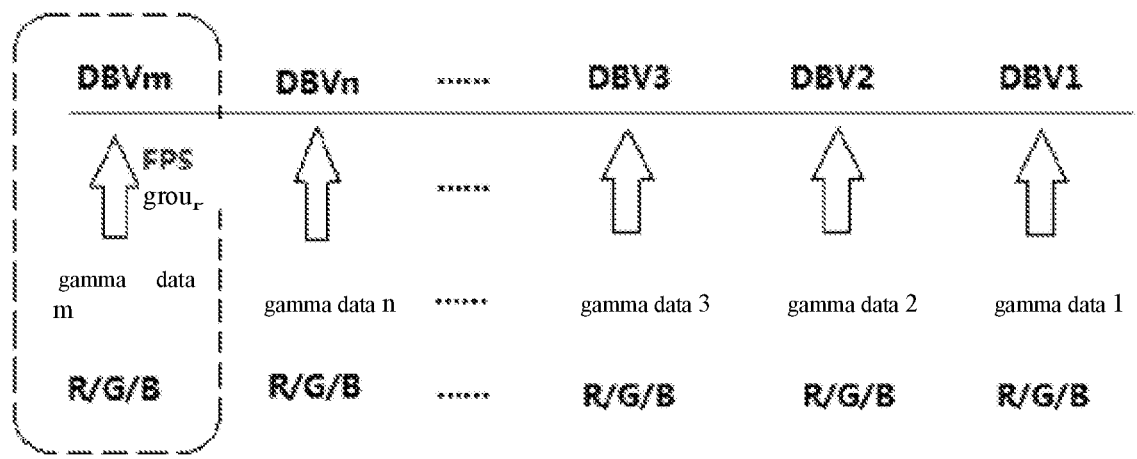
FIG. 2 is a schematic diagram showing gamma data according to an embodiment of the present disclosure.

For example, as shown in FIG. 2, the terminal device is configured with several groups of gamma data. Different groups of gamma data may be corresponding to different driving voltages. Specifically, one group of gamma data may be corresponding to one driving voltage, and any group of gamma data may be corresponding to 256 gray scales. When the gamma data and the driving voltage are set, the corresponding brightness naturally appears, so that the brightness of the screen can be varied through the above groups of gamma data. In the drawings, the driving voltage is represented with DBV.

Optionally, the terminal device is pre-configured with a second gamma data for the first mode, the method further includes: in the first mode, adjusting brightness of the first area and the second area by calling the second gamma data.

As shown in FIG. 2, the gamma data m is the first gamma data described in the above embodiment, and this gamma data may be corresponding to a group of fingerprint identification sensors when the second mode is the fingerprint identification mode. The above second gamma data may be any one gamma data of the gamma data 1 to the gamma data n shown in FIG. 2.

In this way, the second gamma data can be called in the first mode. After entering the second mode, the first gamma data can be called. In other words, the brightness of the screen can be adjusted by calling different gamma data in different modes, thereby further improving the display performance of the terminal device.

Similarly, adjusting the brightness of the first area of the screen of the terminal device from the first brightness to the second brightness may include: adjusting the brightness of the first area of the screen of the terminal device from the first brightness to the second brightness by calling the second gamma data.

It should be noted that, in some embodiments of the present disclosure, it is not limited to adjust the brightness of the second area and the first area in the second mode based on the first gamma data. For example, when the terminal device is provided with one gamma data that matches the required brightness of the second area in the second mode, this gamma data may be called to adjust the brightness of the second area and the first area in the second mode. Of course, when the above first gamma data for the second mode is adopted, the brightness of the fingerprint identification area is more accurate, thereby improving the accuracy of fingerprint identification. For example, when the above terminal device has a high brightness monitor (HBM) highlight mode, since the brightness of HBM highlight mode may not match the brightness required by the second mode, one gamma data corresponding to the HBM highlight mode is not used to adjust the brightness of the second area, thereby making the brightness of the second area more accurate.

Optionally, in the above embodiments, when a pulse width modulation (PWM) value of the screen is less than or equal to a preset threshold, the second driving voltage is a driving voltage obtained in a way of compensating a difference driving voltage with a preset compensation intensity value, where the difference driving voltage is a driving voltage corresponding to a difference of the third brightness and the second brightness; or, when the pulse width modulation value of the screen is greater than the preset threshold, the second driving voltage is the driving voltage corresponding to the difference of the third brightness and the second brightness.

The above preset threshold is determined according to display characteristics of a display panel applied in the terminal device. When the PWM value of the display panel applied in the terminal device is less than or equal to the preset threshold, the display panel applied in the terminal device may have a color deviation problem, such as a low grayscale color deviation problem. In this way, by compensating the difference driving voltage with the preset compensation intensity value and using a compensated driving voltage for driving, the color deviation problem can be avoided, thereby improving displaying effect.

It should be noted that the above driving voltage corresponding to the difference of the third brightness and the second brightness may be obtained in advance by debugging according to the difference between the third brightness and the second brightness or by linear interpolation based on the difference between the third brightness and the second brightness.

In addition, in this embodiment, a plurality of compensation intensity values may be configured in advance. The compensation intensity value used above may be a compensation intensity value determined according to display characteristics of the display panel applied in the above terminal device, thereby providing better compensation effect. Specifically, the above preset threshold and the above compensation intensity value may be added to a display driving integrated circuit (IC) of the terminal device.

In this embodiment, since the brightness of the first area is adjusted by calling the above first gamma data for the second mode rather than calling a gamma data for a normal mode, in the process of adjusting the brightness of the first area, when the PWM value is less than or equal to the preset threshold, the color deviation problem may occur. In view of this, in this embodiment, when the PWM value is less than or equal to the preset threshold, the above compensation intensity value may be called for compensation, thereby avoiding the low grayscale color deviation problem. Further, when the PWM value is greater than the preset threshold, the color deviation problem does not occur, and then the first area can be driven directly by the driving voltage corresponding to the difference of the third brightness and the second brightness.

As an optional embodiment, the second area is at a first position in a preset area in a first time period, and the second area is at a second position in the preset area in a second time period. The first time period and the second time period are different time periods, and the first position and the second position are different positions. In some embodiments, the terminal device automatically controls the second area to be located at different positions in a preset area at different time periods.

Figure 3:
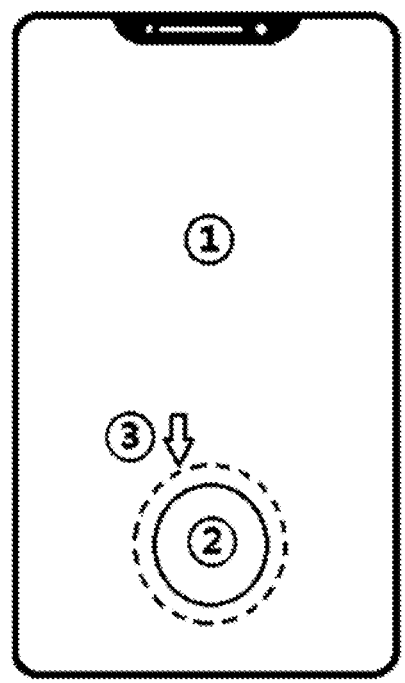
FIG. 3 is a schematic diagram showing areas of a screen according to an embodiment of the present disclosure.

The above preset area may be an area set in advance on the screen. For example, as shown in FIG. 3, there are an area 1, an area 2 and an area 3 on the screen. The area 2 is the second area. The area 3 is an area shown with dotted line in FIG. 3, and is the above preset area. In this embodiment, since the second area is located at different positions in the first time period and the second time period, the second area can be randomly changed within the preset area, thereby avoiding the problem that the service life of some parts of the screen is too short due to the position of the second area being constant. For example, each time the user uses the fingerprint unlocking function, the fingerprint identification area randomly appears any position within the preset area and is different from the previous position.

In some embodiments of the present disclosure, when confirming switching from the first mode to the second mode, the brightness of the first area of the screen of the terminal device is adjusted from the first brightness to the second brightness; where the first brightness is the brightness of the first area in the first mode, and the first brightness is different from the second brightness. After entering the second mode, the brightness of the second area of the screen is set to be the third brightness; where after entering the second mode, the brightness of the first area is the second brightness. In this way, the brightness of the second area can be accurately controlled, thereby improving the display performance of the terminal device. In addition, when confirming switching from the first mode to the second mode, the brightness of the first area of the screen of the terminal device is adjusted from the first brightness to the second brightness, and this can further avoid the flicker problem of the first area, thereby improving display performance of the terminal device.

Figure 4:
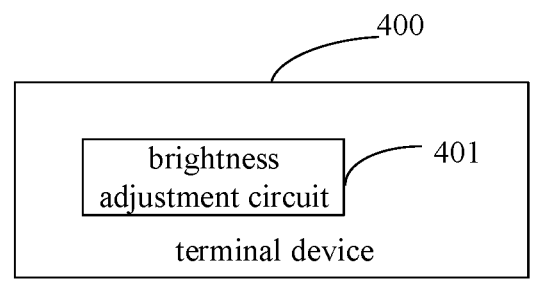
FIG. 4 is a schematic diagram of a terminal device according to an embodiment of the present disclosure.

Referring to FIG. 4, FIG. 4 is a schematic diagram of a terminal device according to an embodiment of the present disclosure. As shown in FIG. 4, THE terminal device 400 includes a brightness adjustment circuit 401.

The brightness adjustment circuit 401 is configured to, when confirming switching from a first mode to a second mode, adjust a brightness of a first area of a screen of the terminal device from a first brightness to a second brightness; where the first brightness is the brightness of the first area in the first mode, and the first brightness is different from the second brightness.

The brightness adjustment circuit 401 is further configured to, after entering the second mode, set a brightness of a second area of the screen to be a third brightness; where after entering the second mode, the brightness of the first area is the second brightness.

The brightness adjustment circuit 401 may be a driving integrated circuit (IC) or a brightness control circuit in the screen, such as a driving integrated circuit (IC) or a brightness control circuit in a display module.

Optionally, the first mode is a non-fingerprint identification mode, and the second mode is a fingerprint identification mode.

Optionally, the second area is a fingerprint identification area, and the first area is an area of the screen other than the second area.

Optionally, the terminal device is pre-configured with a first gamma data for the second mode. The brightness adjustment circuit 401 is further configured to, after entering the second mode, set a driving voltage of the second area to a first driving voltage and set a driving voltage of the first area to a second driving voltage, and call the first gamma data for displaying. When the driving voltage of the second area is set to the first driving voltage and the first gamma data is called, the brightness of the second area is the third brightness. When the driving voltage of the first area is set to the second driving voltage and the first gamma data is called, the brightness of the first area is the second brightness.

Optionally, the terminal device is pre-configured with a second gamma data for the first mode. The brightness adjustment circuit 401 is further configured to, in the first mode, adjust brightness of the first area and the second area by calling the second gamma data.

Optionally, the brightness adjustment circuit 401 is further configured to, during a time period between confirming entering the second mode and entering the second mode, control the brightness of the first area of the screen of the terminal device to change gradually from the first brightness to the second brightness.

Optionally, when the pulse width modulation (PWM) value of the screen is less than or equal to a preset threshold, the second driving voltage is a driving voltage obtained in a way of compensating a difference driving voltage with a preset compensation intensity value, where the difference driving voltage is a driving voltage corresponding to a difference of the third brightness and the second brightness. When the pulse width modulation value of the screen is greater than the preset threshold, the second driving voltage is the driving voltage corresponding to the difference of the third brightness and the second brightness.

Optionally, the second area is at a first position in a preset area in a first time period, and the second area is at a second position in the preset area in a second time period. The first time period and the second time period are different time periods, and the first position and the second position are different positions.

It should be noted that, the terminal device 400 of the above embodiment can implement any implementation mode of the method embodiment shown in FIG. 1. In other words, any implementation mode of the method embodiment shown in FIG. 1 can be implemented by the terminal device 400 of the above embodiment, and the same beneficial effects can be achieved. Details of the terminal device 400 of the above embodiment are not elaborated herein.

Figure 5:
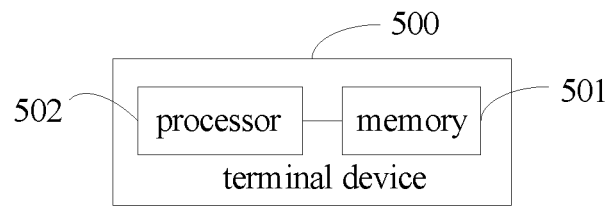
FIG. 5 is a schematic diagram of a terminal device according to an embodiment of the present disclosure.

Referring to FIG. 5, FIG. 5 is a schematic diagram of a terminal device according to an embodiment of the present disclosure. As shown in FIG. 5, the terminal device 500 includes a memory 501, a processor 502, and a computer program stored on the memory 501 and executable on the processor 502. The processor 502 is configured to read the computer program stored on the memory 501 to perform the following process:

when confirming switching from a first mode to a second mode, adjusting a brightness of a first area of a screen of the terminal device from a first brightness to a second brightness; where the first brightness is the brightness of the first area in the first mode, and the first brightness is different from the second brightness; and after entering the second mode, setting a brightness of a second area of the screen to be a third brightness; where after entering the second mode, the brightness of the first area is the second brightness.

Optionally, the first mode is a non-fingerprint identification mode, and the second mode is a fingerprint identification mode.

Optionally, the second area is a fingerprint identification area, and the first area is an area of the screen other than the second area.

Optionally, the terminal device is pre-configured with a first gamma data for the second mode. The processor 502 performs the step of setting a brightness of a second area of the screen to be a third brightness after entering the second mode, in a way including: after entering the second mode, setting a driving voltage of the second area to a first driving voltage and set a driving voltage of the first area to a second driving voltage, and calling the first gamma data for displaying. When the driving voltage of the second area is set to the first driving voltage and the first gamma data is called, the brightness of the second area is the third brightness. When the driving voltage of the first area is set to the second driving voltage and the first gamma data is called, the brightness of the first area is the second brightness.

Optionally, the terminal device is pre-configured with a second gamma data for the first mode. The processor 502 is further configured to, in the first mode, adjust brightness of the first area and the second area by calling the second gamma data.

Optionally, when the pulse width modulation (PWM) value of the screen is less than or equal to a preset threshold, the second driving voltage is a driving voltage obtained in a way of compensating a difference driving voltage with a preset compensation intensity value, where the difference driving voltage is a driving voltage corresponding to a difference of the third brightness and the second brightness. When the pulse width modulation value of the screen is greater than the preset threshold, the second driving voltage is the driving voltage corresponding to the difference of the third brightness and the second brightness.

Optionally, the processor 502 performs the step of adjusting a brightness of a first area of a screen of the terminal device from a first brightness to a second brightness when confirming switching from a first mode to a second mode, in a way including: during a time period between confirming entering the second mode and entering the second mode, controlling the brightness of the first area of the screen of the terminal device to change gradually from the first brightness to the second brightness.

Optionally, the second area is at a first position in a preset area in a first time period, and the second area is at a second position in the preset area in a second time period. The first time period and the second time period are different time periods, and the first position and the second position are different positions.

It should be noted that, the terminal device 500 of the above embodiment can implement any implementation mode of the method embodiment shown in FIG. 1. In other words, any implementation mode of the method embodiment shown in FIG. 1 can be implemented by the terminal device 500 of the above embodiment, and the same beneficial effects can be achieved. Details of the terminal device 500 of the above embodiment are not elaborated herein.

One embodiment of the present disclosure further provides a non-transitory computer readable storage medium, where the non-transitory computer readable storage medium stores a computer program. When the computer program is executed by the processor, the steps of the brightness control method provided by the embodiment of the present disclosure are implemented.

As stated above, the foregoing only describes specific embodiments of the present disclosure. However, the protection scope of the present disclosure is not limited to the specific embodiments. Any changes or replacements, which can be easily thought of by technical personnel familiar with the technical field, are covered by the protection scope of the present disclosure. Therefore, the protection scope of the present disclosure shall be subject to the protection scope of the claims.

What is claimed is:

1. A brightness control method applied to a terminal device, comprising:
when confirming switching from a first mode to a second mode, adjusting a brightness of a first area of a screen of the terminal device from a first brightness to a second brightness; wherein the first brightness is the brightness of the first area in the first mode, and the first brightness is different from the second brightness; and
after entering the second mode, setting a brightness of a second area of the screen to be a third brightness; wherein after entering the second mode, the brightness of the first area is the second brightness;
wherein the terminal device is pre-configured with a first gamma data for the second mode;
after entering the second mode, setting a brightness of a second area of the screen to be a third brightness, includes:
after entering the second mode, setting a driving voltage of the second area to a first driving voltage and setting a driving voltage of the first area to a second driving voltage, and calling the first gamma data for displaying;
wherein when the driving voltage of the second area is set to the first driving voltage and the first gamma data is called, the brightness of the second area is the third brightness; and when the driving voltage of the first area is set to the second driving voltage and the first gamma data is called, the brightness of the first area is the second brightness.

2. The method of claim 1, wherein the first mode is a non-fingerprint identification mode, and the second mode is a fingerprint identification mode.

3. The method of claim 2, wherein the second area is a fingerprint identification area, and the first area is an area of the screen other than the second area.

4. The method of claim 1, wherein the terminal device is pre-configured with a second gamma data for the first mode, the method further includes: in the first mode, adjusting brightness of the first area and the second area by calling the second gamma data.

5. The method of claim 1, wherein when a pulse width modulation (PWM) value of the screen is less than or equal to a preset threshold, the second driving voltage is a driving voltage obtained in a way of compensating a difference driving voltage with a preset compensation intensity value, wherein the difference driving voltage is a driving voltage corresponding to a difference of the third brightness and the second brightness; or,
when the pulse width modulation value of the screen is greater than the preset threshold, the second driving voltage is the driving voltage corresponding to the difference of the third brightness and the second brightness.

6. The method of claim 1, wherein when confirming switching from a first mode to a second mode, adjusting a brightness of a first area of a screen of the terminal device from a first brightness to a second brightness, includes:
during a time period between confirming entering the second mode and entering the second mode, controlling the brightness of the first area of the screen of the terminal device to change gradually from the first brightness to the second brightness.

7. The method of claim 1, wherein the second area is at a first position in a preset area in a first time period, and the second area is at a second position in the preset area in a second time period; the first time period and the second time period are different time periods, and the first position and the second position are different positions.

8. The method of claim 7, wherein the method further includes: controlling, by the terminal device, the second area to be located at different positions in the preset area at different time periods.

9. The method of claim 1, wherein adjusting a brightness of a first area of a screen of the terminal device from a first brightness to a second brightness, includes:
automatically controlling, by the terminal device, the brightness of the first area of the screen from the first brightness to the second brightness.

10. A terminal device comprising:
a brightness adjustment circuit configured to, when confirming switching from a first mode to a second mode, adjust a brightness of a first area of a screen of the terminal device from a first brightness to a second brightness; wherein the first brightness is the brightness of the first area in the first mode, and the first brightness is different from the second brightness;
wherein the brightness adjustment circuit is further configured to, after entering the second mode, set a brightness of a second area of the screen to be a third brightness; wherein after entering the second mode, the brightness of the first area is the second brightness;
wherein the terminal device is pre-configured with a first gamma data for the second mode; the brightness adjustment circuit is further configured to, after entering the second mode, set a driving voltage of the second area to a first driving voltage and set a driving voltage of the first area to a second driving voltage, and call the first gamma data for displaying;
when the driving voltage of the second area is set to the first driving voltage and the first gamma data is called, the brightness of the second area is the third brightness; when the driving voltage of the first area is set to the second driving voltage and the first gamma data is called, the brightness of the first area is the second brightness.

11. The terminal device of claim 10, wherein the terminal device is pre-configured with a second gamma data for the first mode; the brightness adjustment circuit is further configured to, in the first mode, adjust brightness of the first area and the second area by calling the second gamma data.

12. The terminal device of claim 10, wherein the brightness adjustment circuit is further configured to control the second area to be located at different positions in a preset area at different time periods.

13. The terminal device of claim 10, wherein the brightness adjustment circuit is further configured to control the brightness of the first area of the screen from the first brightness to the second brightness.

14. The terminal device of claim 10, wherein the brightness adjustment circuit is a driving integrated circuit or a brightness control circuit in the screen.

15. A terminal device with a screen fingerprint identification function, comprising: a memory, a processor, and a computer program stored on the memory and executable on the processor; wherein the computer program is executed by the processor to implement steps of the brightness control method of claim 1.

16. A non-transitory computer readable storage medium, storing a computer program; wherein the computer program is executed by a processor to implement steps of the brightness control method of claim 1.

17. A brightness control method applied to a terminal device, comprising:
when confirming switching from a first mode to a second mode, adjusting a brightness of a first area of a screen of the terminal device from a first brightness to a second brightness; wherein the first brightness is the brightness of the first area in the first mode, and the first brightness is different from the second brightness; and
after entering the second mode, setting a brightness of a second area of the screen to be a third brightness; wherein after entering the second mode, the brightness of the first area is the second brightness;
wherein when confirming switching from a first mode to a second mode, adjusting a brightness of a first area of a screen of the terminal device from a first brightness to a second brightness, includes:
during a time period between confirming entering the second mode and entering the second mode, controlling the brightness of the first area of the screen of the terminal device to change gradually from the first brightness to the second brightness.

18. The method of claim 17, wherein the first mode is a non-fingerprint identification mode, and the second mode is a fingerprint identification mode.

19. The method of claim 18, wherein the second area is a fingerprint identification area, and the first area is an area of the screen other than the second area.

20. The method of claim 17, wherein adjusting a brightness of a first area of a screen of the terminal device from a first brightness to a second brightness, includes:
automatically controlling, by the terminal device, the brightness of the first area of the screen from the first brightness to the second brightness.

* * * * *